US011429371B2

(12) United States Patent
Chu et al.

(10) Patent No.: US 11,429,371 B2
(45) Date of Patent: Aug. 30, 2022

(54) LIFE CYCLE MANAGEMENT ACCELERATION

(71) Applicant: Dell Products L.P., Round Rock, TX (US)

(72) Inventors: Yining Chu, Shanghai (CN); Hong Yuan, Shanghai (CN); Zhe Huang, Suzhou (CN); HongGang Liu, Shanghai (CN); Huiying Shen, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/916,249

(22) Filed: Jun. 30, 2020

(65) Prior Publication Data

US 2021/0389991 A1 Dec. 16, 2021

(30) Foreign Application Priority Data

Jun. 10, 2020 (CN) .......................... 202010522200.9

(51) Int. Cl.
*G06F 8/65* (2018.01)
*G06F 9/50* (2006.01)
*G06F 9/48* (2006.01)

(52) U.S. Cl.
CPC ................ *G06F 8/65* (2013.01); *G06F 9/485* (2013.01); *G06F 9/5044* (2013.01); *G06F 9/5083* (2013.01); *G06F 2209/503* (2013.01)

(58) Field of Classification Search
CPC .... G06F 8/60–66; G06F 9/485; G06F 9/5044; G06F 9/5072; G06F 9/5083; G06F 2209/503; G06F 11/2023–2033

USPC ................................................... 717/168–178
See application file for complete search history.

(56) References Cited

U.S. PATENT DOCUMENTS

| 10,001,983 | B2 * | 6/2018 | Roy ...................... G06F 9/5083 |
| 2006/0130042 | A1 * | 6/2006 | Dias ...................... G06F 9/5083 |
| | | | 717/168 |
| 2007/0006015 | A1 * | 1/2007 | Rao ...................... G06F 11/2028 |
| | | | 714/4.1 |
| 2018/0032323 | A1 * | 2/2018 | Roy ...................... H04L 67/34 |
| 2020/0241904 | A1 * | 7/2020 | Mitovski ............... G06F 9/5044 |

(Continued)

OTHER PUBLICATIONS

Capacity Planning With Fault Domains In Your vSAN Environment, Occasional IT, 2017, 30 pages, [retrieved on Jun. 24, 2022], Retrieved from the Internet: <URL:https://occasional-it.com/2017/06/30/capacity-planning-with-fault-domains-in-your-vsan-environment/>.*

(Continued)

*Primary Examiner* — Geoffrey R St Leger
(74) *Attorney, Agent, or Firm* — Jackson Walker L.L.P.

(57) ABSTRACT

An information handling system may include at least one processor; and a non-transitory memory coupled to the at least one processor. The information handling system may be configured to manage an upgrade of a cluster of N host systems by: receiving an indication of a number M of host systems of the cluster that are needed to satisfy an operational requirement of the cluster; removing N-M of the host systems from the cluster; causing the removed host systems to be upgraded in parallel; and adding at least one of the removed host systems back to the cluster after the at least one of the removed host systems has completed the upgrade.

17 Claims, 7 Drawing Sheets

(56) References Cited

U.S. PATENT DOCUMENTS

2021/0055872 A1* 2/2021 Epping ................ G06F 3/0604

OTHER PUBLICATIONS

High-availability cluster, Wikipedia, 2018, 5 pages, [retrieved on Jun. 24, 2022], Retrieved from the Internet: <URL:https://web.archive.org/web/20180809023532/https://en.wikipedia.org/wiki/High-availability_cluster>.*

* cited by examiner

LIFE CYCLE MANAGEMENT ACCELERATION

TECHNICAL FIELD

The present disclosure relates in general to information handling systems, and more particularly to accelerating life cycle management events in a cluster environment such as a hyperconverged infrastructure (HCI) cluster.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As used herein, the term life cycle management (LCM) refers to an approach for upgrading components within a cluster of information handling systems (e.g., containing some number 2 to N of individual node systems). Such clusters may comprise hyper-converged infrastructure (HCI) clusters in some embodiments. In these and other embodiments, individual nodes may be located within a single datacenter, or they may be geographically distributed elements of a networked architecture. HCI generally refers to a software-defined IT infrastructure, which typically includes elements such as virtualized computing (e.g., a hypervisor), software-defined storage, and virtualized networking (e.g., software-defined networking).

During an LCM event, typically each node of a cluster may be upgraded, with upgrade components such as firmware, drivers, application software, etc. until the entire cluster reaches the same system version.

LCM is an important part of HCI management. A successful upgrade of an HCI cluster requires all hosts within the cluster to be upgraded. Current upgrade methods are limited by FTT (failures to tolerate). FTT determines how many faulted hosts are allowed in a cluster without data loss in the cluster.

In some embodiments (e.g., clusters implementing RAID storage), the FTT number is determined by the RAID method, such that FTT can typically only be 2 at most (e.g., for RAID-6), while FTT=1 for RAID-5 and RAID-1, etc. Accordingly, if business services are not allowed to be interrupted during the cluster upgrade (which is usually the case), then the only acceptable practice would be to upgrade hosts sequentially (or at most upgrade 2 hosts in parallel for the FTT=2 situation), which is the common practice in the industry.

However, a large cluster could include dozens of hosts. It could take days to finish the entire cluster upgrade process if only one or two hosts is being upgraded at a time. The cluster upgrade process is a sensitive moment for the customer, and so reducing this time window as much as possible is desirable. Accordingly, embodiments of this disclosure may parallelize the upgrade process, and the time window can be greatly reduced.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with lifecycle management may be reduced or eliminated.

In accordance with embodiments of the present disclosure, an information handling system may include at least one processor; and a non-transitory memory coupled to the at least one processor. The information handling system may be configured to manage an upgrade of a cluster of N host systems by: receiving an indication of a number M of host systems of the cluster that are needed to satisfy an operational requirement of the cluster; removing N-M of the host systems from the cluster; causing the removed host systems to be upgraded in parallel; and adding at least one of the removed host systems back to the cluster after the at least one of the removed host systems has completed the upgrade.

In accordance with these and other embodiments of the present disclosure, a method may include receiving an indication of a number M of host systems of a cluster of N information handling systems that are needed to satisfy an operational requirement of the cluster; removing N-M of the host systems from the cluster; causing the removed host systems to be upgraded in parallel; and adding at least one of the removed host systems back to the cluster after the at least one of the removed host systems has completed the upgrade.

In accordance with these and other embodiments of the present disclosure, an article of manufacture may include a non-transitory, computer-readable medium having computer-executable code thereon that is executable by a processor of an information handling system for managing an upgrade of a cluster of N host systems by: receiving an indication of a number M of host systems of the cluster that are needed to satisfy an operational requirement of the cluster; removing N-M of the host systems from the cluster; causing the removed host systems to be upgraded in parallel; and adding at least one of the removed host systems back to the cluster after the at least one of the removed host systems has completed the upgrade.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
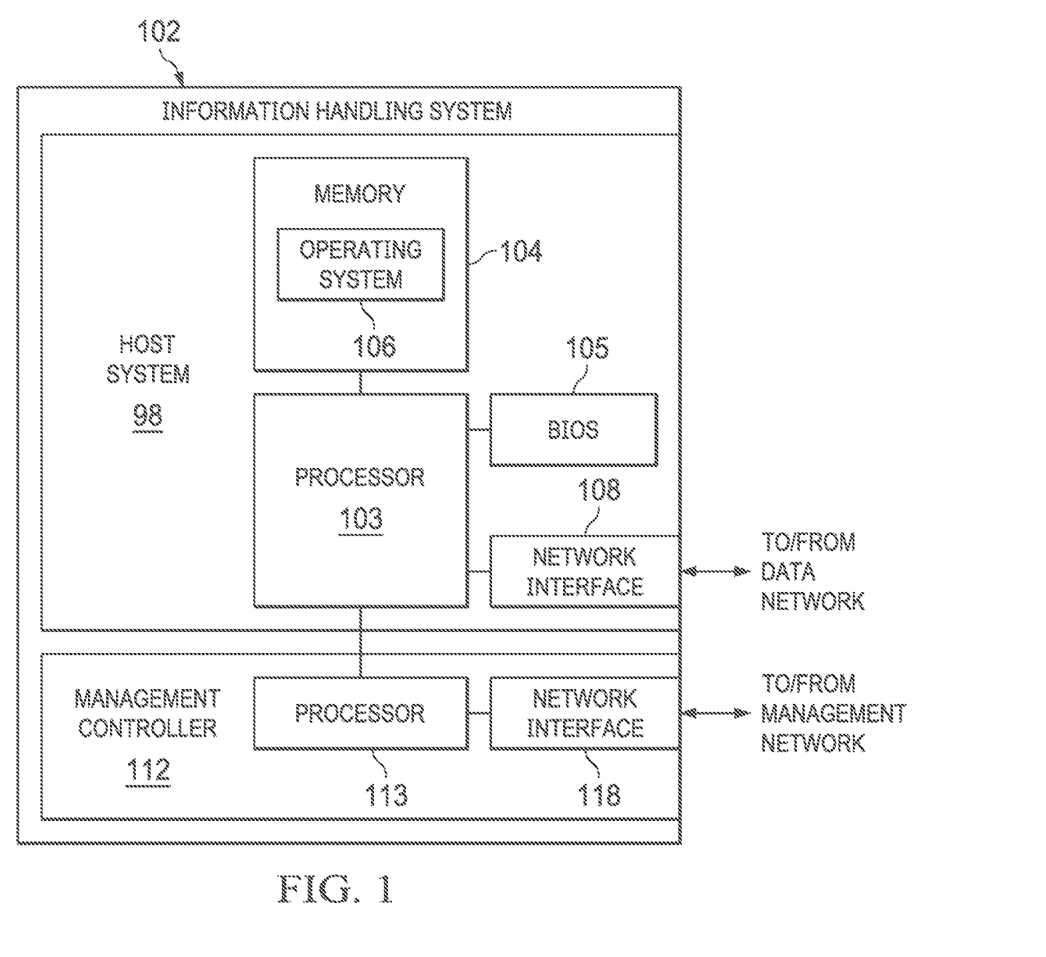
FIG. 1 illustrates a block diagram of an example information handling system, in accordance with embodiments of the present disclosure.
Figure 2:
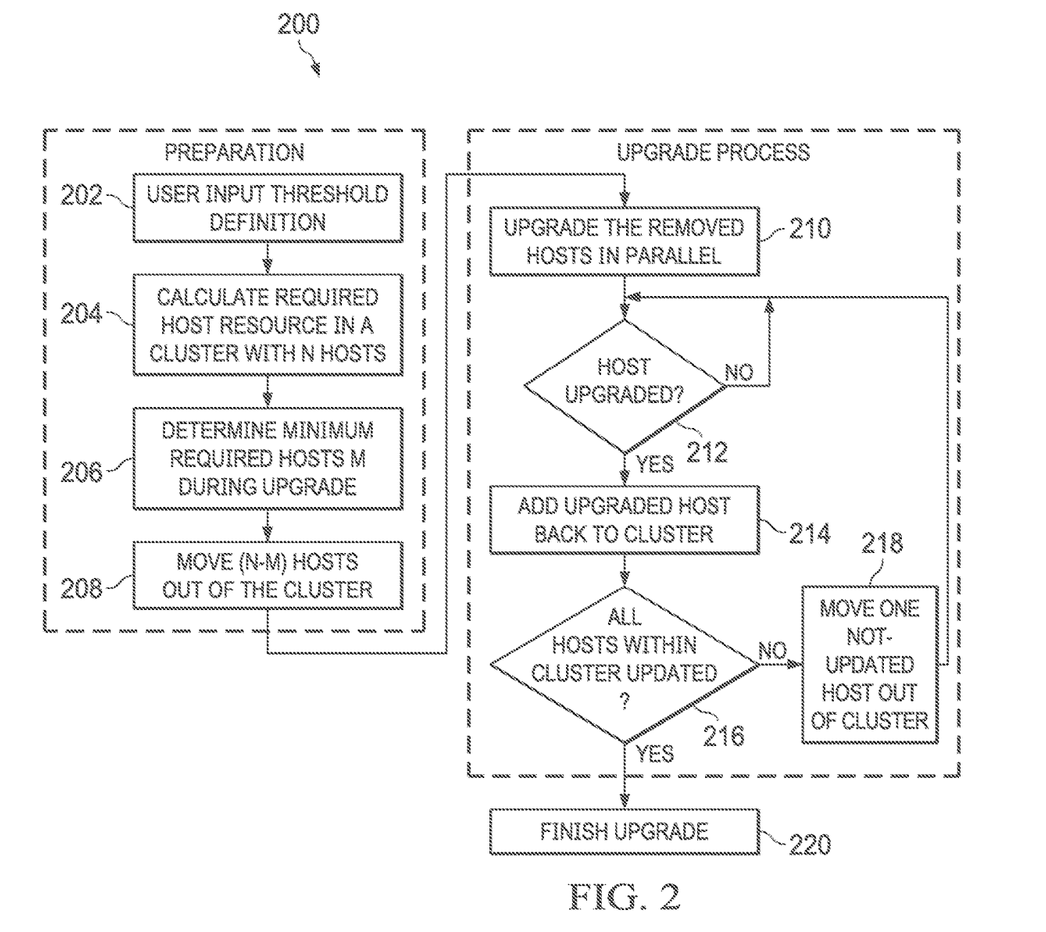
FIG. 2 illustrates an example method, in accordance with embodiments of the present disclosure.

Preferred embodiments and their advantages are best understood by reference to FIGS. 1 through 3, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, it would be desirable to parallelize the process of upgrading hosts within an HCI cluster in order to reduce the time required for completion of an LCM event. Embodiments of this disclosure may reduce upgrade time to a large extent by making multiple hosts upgrade in parallel without causing data loss or service disruption, by providing a method to utilize idle resources.

For data protection purposes, FTT is often the current limiting factor for parallel upgrading. Typically a cluster can tolerate at most 1-2 hosts missing at the same time. However, there is a possibility that the actual resource requirement for a cluster may be much less than the FTT number would suggest, and so embodiments of this disclosure may make use of the idle resources for upgrades.

In some embodiments, before an upgrade begins, a pre-check procedure may measure the minimum required resources according to hardware performance (e.g., including computing, memory, disk capacity, and software platform condition). A user (e.g., an administrator) may define the required workload threshold (such as 20% redundancy, 50% resource availability, etc.).

The upgrade pre-check procedure may then take into consideration the minimum required resources and redundancy, as well as the user-defined threshold. Thus the minimum required number of hosts within a cluster may be determined.

During the upgrade, the minimum required number of hosts in the cluster may be reserved, and the rest of the hosts may safely be removed from the cluster. The removed hosts are no longer part of the cluster, and the number of removed hosts is not limited by FTT.

The upgrade process may then begin in parallel for all of the removed hosts. The upgrade status for each host may be monitored, and hosts may be added back to the cluster as they complete the upgrade process.

If there are remaining hosts within the cluster that have not yet been upgraded, they can be removed from the cluster in turn as the upgraded hosts are re-added, as long as the minimum required number of hosts remains in the cluster throughout the process. Once all of the hosts have been so upgraded, the LCM process is complete.

Turning now to FIG. 2, a flow chart is shown of an example method 200 for parallel host upgrades in an HCI cluster. Steps 202 through 208 denote the preparation phase, and steps 210-218 denote the upgrade phase. The method may be carried out by one or more upgrade controllers, which may or may not be elements of the cluster. In some embodiments, such an upgrade controller may comprise a management controller as discussed above with respect to FIG. 1.

At step 202, the upgrade controller receives user input regarding a threshold level of required resources and/or redundancy level. At step 204, the upgrade controller calculates the required minimum level of host resources in a cluster of N systems to satisfy the user threshold definition.

At step 206, the upgrade controller determines the minimum number M of required hosts that must remain in the cluster during the upgrade process. The difference between N and M is the number of hosts that can safely be removed from the cluster at step 208 (e.g., the number of idle hosts that can safely be temporarily absent from the cluster).

At step 210, the (N-M) removed hosts may begin to be upgraded in parallel (e.g., all at the same time). The method may loop at step 212 until a host is finished upgrading.

Once a host is finished upgrading, it may be added back to the cluster at step 214. At step 216, the upgrade controller determines whether or not all systems in the cluster have been upgraded. If so, the method ends at step 220. If not, another not-yet-upgraded host is removed from the cluster at step 218, and the method returns to step 212. In particular, by waiting until an upgraded host is returned to the cluster before removing another host, a maximum of (N-M) hosts may be in the removed state at all times during the upgrade process, and so the required minimum number of hosts may be present in the cluster at all times.

One of ordinary skill in the art with the benefit of this disclosure will understand that the preferred initialization point for the method depicted in FIG. 2 and the order of the steps comprising that method may depend on the implementation chosen. In these and other embodiments, this method may be implemented as hardware, firmware, software, applications, functions, libraries, or other instructions. Further, although FIG. 2 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

Turning now to FIG. 3 (which refers collectively to FIGS. 3A through 3I), an example cluster 300 of eight hosts is shown. FIG. 3A illustrates cluster 300 at a point in time prior to an upgrade. The pre-check procedure discussed above may determine that only four hosts are needed to satisfy the workload and redundancy requirements, and so only four hosts must remain in the cluster during the upgrade process. FIG. 3A also demonstrates the depiction of un-upgraded hosts 302, upgraded hosts 304, and upgrade controller 310 which will be used throughout FIG. 3.

Figure 3A:
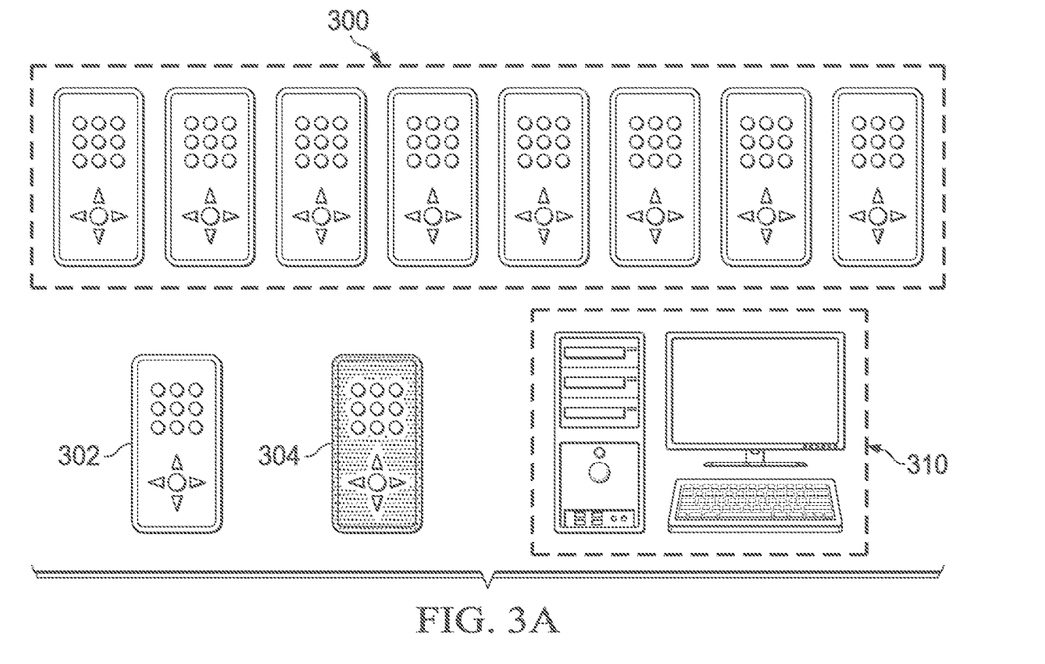
FIG. 3 (which includes FIGS. 3A through 3I) illustrates a block diagram of an upgrade sequence, in accordance with embodiments of the present disclosure.
Figure 3B:
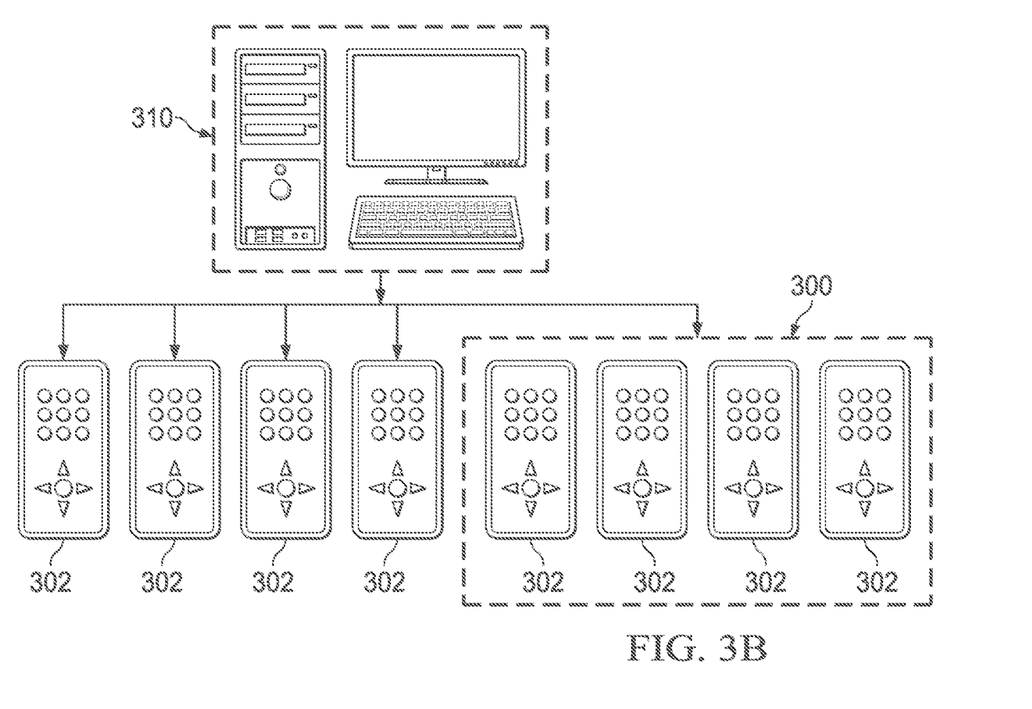

At FIG. 3B, upgrade controller 310 has removed four of the un-upgraded hosts 302 from cluster 300. Four un-upgraded hosts 302 remain in cluster 300. The four removed un-upgraded hosts 302 may then be upgraded in parallel (e.g., simultaneously).

Figure 3C:
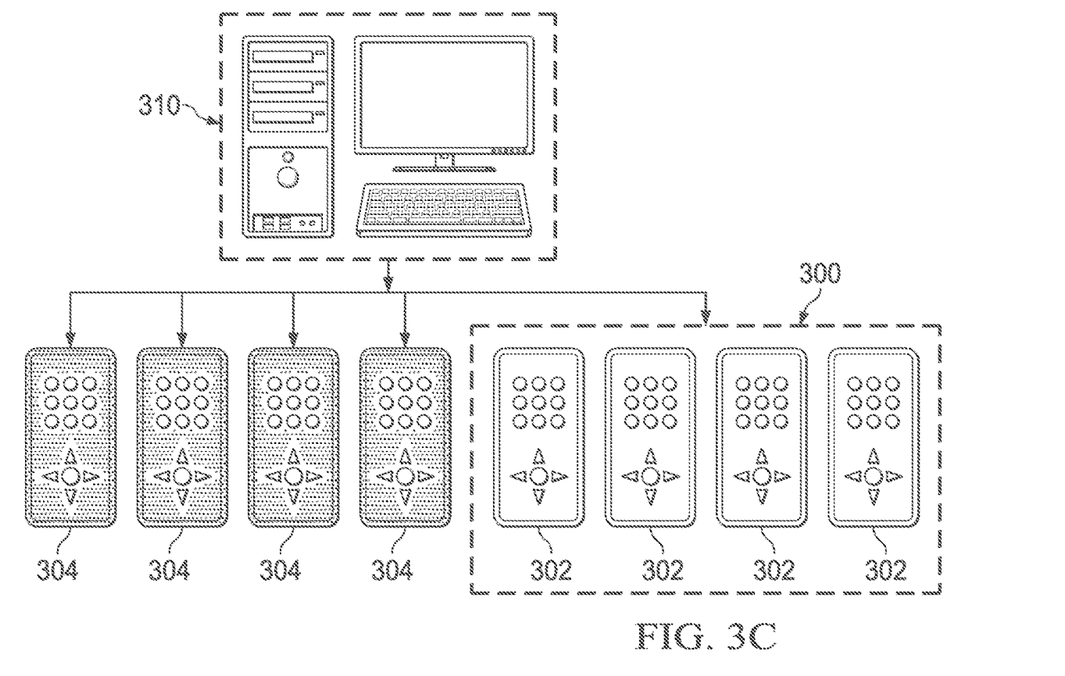
Figure 3D:
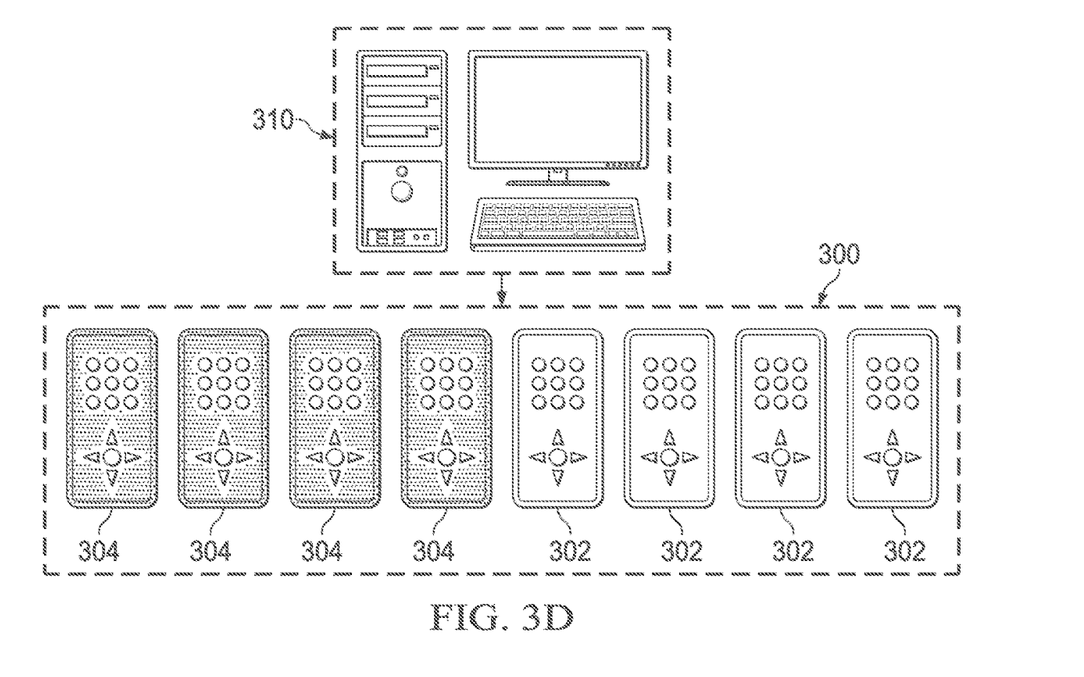

At FIG. 3C, the four removed hosts have completed their upgrades (e.g., simultaneously or at about the same time), and so they are shown as upgraded hosts 304. At FIG. 3D, the four upgraded hosts 304 have been re-added to cluster 300.

Figure 3E:
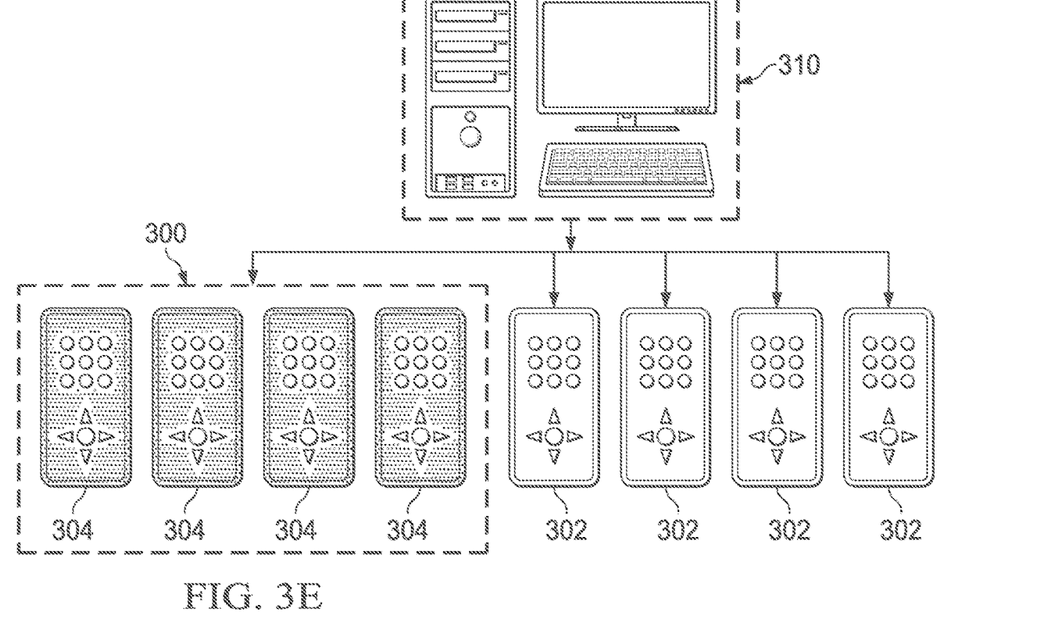
Figure 3F:
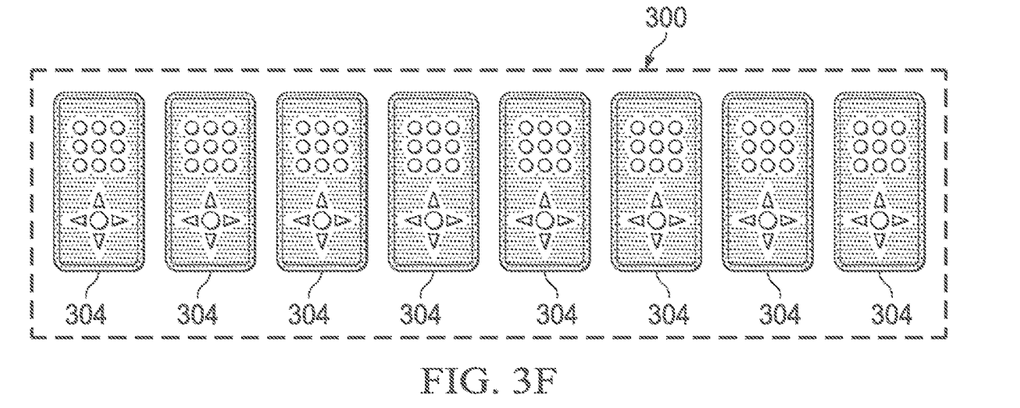

At FIG. 3E, the other four hosts (un-upgraded hosts 302) are removed from cluster 300 to be upgraded in parallel. At FIG. 3F, those four hosts have completed the upgrade and have been re-added to cluster 300, and the procedure is finished.

In other embodiments, the hosts that are being upgraded in parallel may not complete the upgrade at the same time (e.g., due to hardware and/or software differences among the hosts, etc.). There is in general no need to wait until all of the removed hosts finish their upgrades to start the next batch of host upgrade. Because the upgrade time across different hosts can vary significantly, additional time may be saved by not waiting for an entire batch to finish. This may also reduce the risk of a single upgrade failure causing the upgrade procedure to get stuck.

Figure 3G:
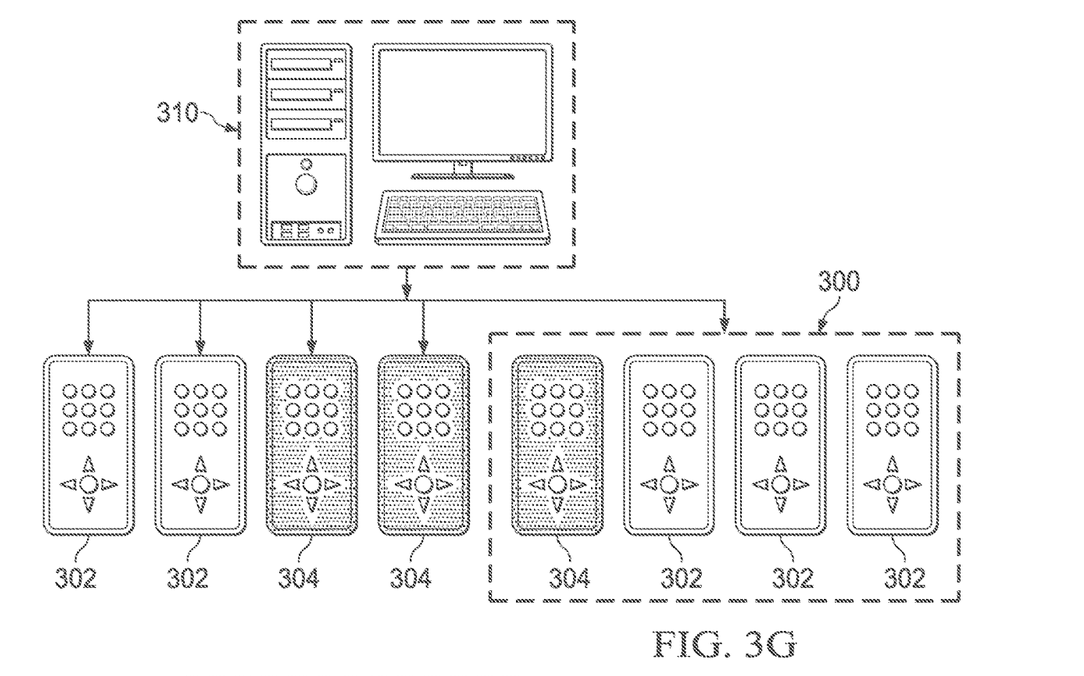
Figure 3H:
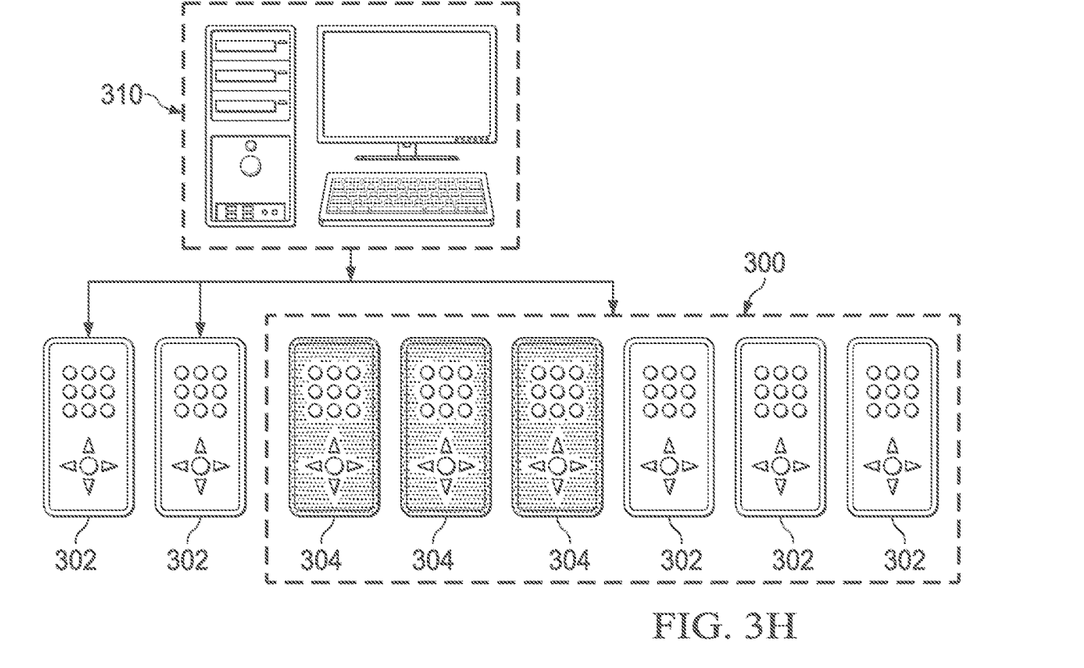
Figure 3I:
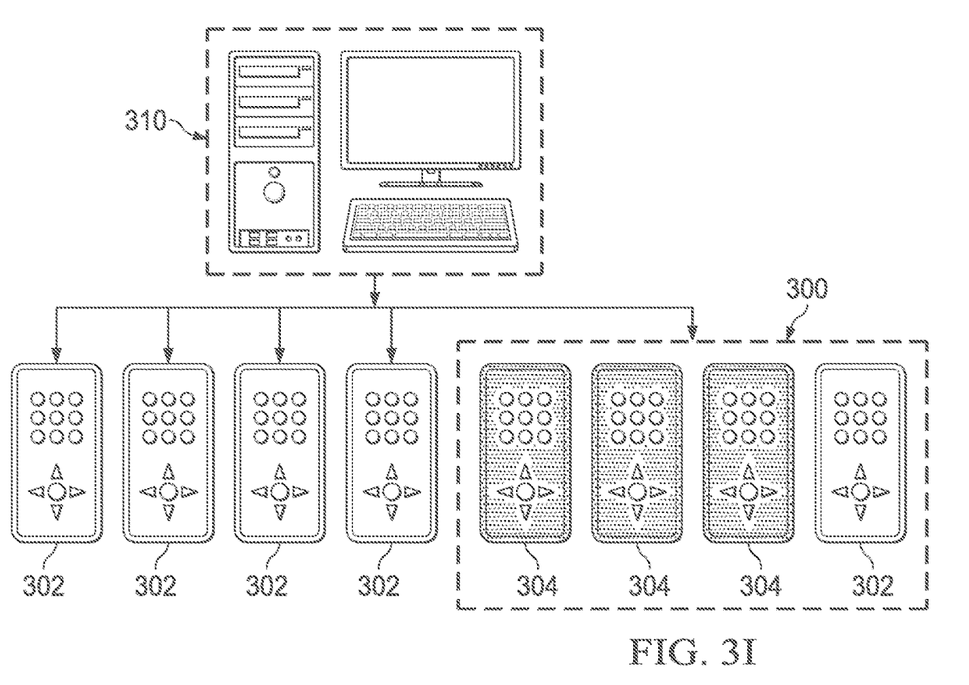

That is, the upgraded hosts may be added back to the cluster as soon as their individual upgrades are finished. Hosts that still need to be upgraded can be removed from the cluster as long as there are enough hosts remaining in the cluster to satisfy the requirements from the pre-check procedure. FIGS. 3G through 3I illustrate this embodiment.

In FIG. 3G, at some point during the upgrade process, cluster 300 may include one upgraded host 304 and three un-upgraded hosts 302. Of the four removed hosts, two have completed the upgrade and two have not. The two that have completed the upgrade may be re-added to cluster 300 as shown at FIG. 3H without waiting for the remaining two removed hosts to complete the upgrade.

At that point in the upgrade process, cluster 300 includes six hosts, while as noted above, only four are needed to satisfy the workload and redundancy requirements. Thus at FIG. 3I, two additional un-upgraded hosts 302 are removed from cluster 300 to be upgraded in parallel with the other removed hosts. In this way, individual hosts can be removed from cluster 300 and upgraded as quickly as possible, saving significant amounts of time in the overall upgrade procedure.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
at least one processor; and
a non-transitory memory coupled to the at least one processor;
wherein the information handling system is configured to manage an upgrade of a cluster of N host systems by:
receiving an indication of a number M of host systems of the cluster that are needed to satisfy an operational requirement of the cluster, wherein receiving the indication includes receiving, from a user, a definition of a required redundancy threshold and determining the number M based on the required redundancy threshold and further based on hardware and software characteristics of the host systems including computing capacity, memory capacity, disk capacity, and software platform condition, such that the required redundancy threshold is met based on the hardware and software characteristics;

removing N-M of the host systems from the cluster;

causing the removed host systems to be upgraded in parallel;

adding at least one of the removed host systems back to the cluster after the at least one of the removed host systems has completed the upgrade; and after adding the at least one of the removed host systems back to the cluster, removing an additional host system from the cluster.

2. The information handling system of claim 1, further configured to:

cause the additional host system to be upgraded.

3. The information handling system of claim 2, wherein the additional host system is upgraded in parallel with at least one other removed host system.

4. The information handling system of claim 1, wherein the information handling system is a host system of the cluster.

5. The information handling system of claim 1, wherein the information handling system is a management controller.

6. A method comprising:

receiving an indication of a number M of host systems of a cluster of N information handling systems that are needed to satisfy an operational requirement of the cluster, wherein receiving the indication includes receiving, from a user, a definition of a required redundancy threshold and determining the number M based on the required redundancy threshold and further based on hardware and software characteristics of the host systems including computing capacity, memory capacity, disk capacity, and software platform condition, such that the required redundancy threshold is met based on the hardware and software characteristics;

removing N-M of the host systems from the cluster;

causing the removed host systems to be upgraded in parallel; and adding at least one of the removed host systems back to the cluster after the at least one of the removed host systems has completed the upgrade; and after adding the at least one of the removed host systems back to the cluster, removing an additional host system from the cluster.

7. The method of claim 6, wherein the cluster has a failures to tolerate (FTT) number associated therewith.

8. The method of claim 7, wherein N-M is greater than the FTT number.

9. The method of claim 6, wherein the cluster is a hyper-converged infrastructure (HCI) cluster.

10. The method of claim 6, further comprising:
causing the additional host system to be upgraded in parallel with at least one other removed host system.

11. The method of claim 6, wherein adding the at least one of the removed host systems back to the cluster after the at least one of the removed host systems has completed the upgrade comprises adding all of the removed host systems back to the cluster after all of the removed host systems have completed the upgrade.

12. An article of manufacture comprising a non-transitory, computer-readable medium having computer-executable code thereon that is executable by a processor of an information handling system for managing an upgrade of a cluster of N host systems by:

receiving an indication of a number M of host systems of the cluster that are needed to satisfy an operational requirement of the cluster, wherein receiving the indication includes receiving, from a user, a definition of a required redundancy threshold and determining the number M based on the required redundancy threshold and further based on hardware and software characteristics of the host systems including computing capacity, memory capacity, disk capacity, and software platform condition, such that the required redundancy threshold is met based on the hardware and software characteristics;

removing N-M of the host systems from the cluster;

causing the removed host systems to be upgraded in parallel; and adding at least one of the removed host systems back to the cluster after the at least one of the removed host systems has completed the upgrade; and after adding the at least one of the removed host systems back to the cluster, removing an additional host system from the cluster.

13. The article of claim 12, wherein the code is further executable for:

causing the additional host system to be upgraded.

14. The article of claim 13, wherein the additional host system is upgraded in parallel with at least one other removed host system.

15. The article of claim 14, wherein the code is further executable for:

repeatedly removing further host systems from the cluster;

causing the further host systems to be upgraded; and adding the further host systems back to the cluster;

such that at least M host systems remain in the cluster during the upgrade of the cluster.

16. The article of claim 12, wherein the information handling system is a host system of the cluster.

17. The article of claim 12, wherein the information handling system is a management controller.

* * * * *